Patented Oct. 19, 1937

2,096,295

UNITED STATES PATENT OFFICE 2,096,295

DYESTUFFS CAPABLE OF BEING CHROMED

Wilhelm Eckert and Otto Braunsdorf, Frankfort-on-the-Main-Hochst, and Erich Fischer, Bad Soden-on-the-Taunus, Germany, assignors to General Aniline Works, Inc., New York, N. Y., a corporation of Delaware No Drawing. Application June 28, 1935, Serial No. 28,974. In Germany July 14, 1934

4 Claims. (Cl. 260—64)

The present invention relates to dyestuffs capable of being chromed.

It has been found that dyestuffs are obtainable yielding dyeings on wool which when treated according to the so-called "after chroming-process", are distinguished by very good properties of fastness, especially by a good fastness to light, besides a very pure tint and a very good levelling power, by condensing an aminonaphthalic acid or a derivative or substitution product thereof with an aromatic or hydro-aromatic amino-compound which contains in heteronuclear position a carboxylic group and a hydroxyl or imino group in ortho-position to the carboxyl group and either using reaction components, of which at least one contains a sulfonic acid group or using non-sulfonated reaction components and sulfonating subsequently the condensation product. The dyestuffs thus obtained are new. For instance, there are obtained dyestuffs of the following general constitution:

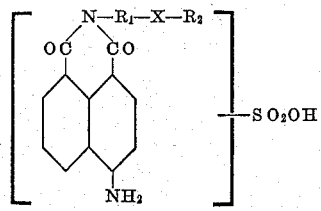

wherein X means a member of the group consisting of —$SO_2NH$—, —$CONH$—, —$CH_2SO_2$— and —$CH_2$—, and $R_1$ and $R_2$ represent aryl radicals, $R_2$ containing a carboxyl and a hydroxyl group in ortho-positions to each other, and dyestuffs of the general formula:

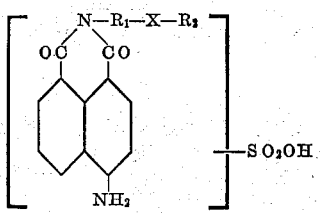

wherein X means a member of the group consisting of —$SO_2NH$— and —$CONH$—, and $R_1$ and $R_2$ represent aryl radicals, $R_2$ containing a carboxyl group in ortho-position to the NH—group of X, and the alkali metal salts of these compounds.

The condensation may be performed, as described, in U. S. Patent No. 1,796,011, in water, for instance, by heating in an aqueous sodium bisulfite solution to a temperature between 80° C. and 120° C.; it is also possible to obtain the same or similar dyestuffs by starting (as described in U. S. Patent 1,796,012) from the corresponding nitronaphthalic acid derivatives, for instance:

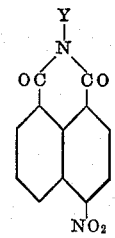

wherein Y represents the radical —$R_1$—X—$R_2$ of the first formula, reducing such derivative and subsequently sulfonating it or treating it with a reducing agent which allows simultaneously the reduction and the introduction of a sulfonic acid group into the molecule, such as, for instance, an alkali hydrosulfite or bisulfite.

It is also possible to perform the condensation and the reduction in a single operation.

It has furthermore been found that chromium complex salts may be formed from all representatives of the said class of compounds, not only on the fiber as already described but also in substance, whereby dyestuffs are obtained which are distinguished by very good properties of fastness, even without being after-chromed.

Such dyestuffs containing a chromium complex already in the molecule may be made in various known manners.

The following examples serve to illustrate the invention but they are not intended to limit it thereto; the parts are by weight, unless otherwise stated.

(9) 90 parts of 4-amino-sulfo-1.8-naphthalic acid or the corresponding amount of the anhydride obtainable by sulfonation of 4-amino-1.8-naphthalic acid anhydride with sulfuric acid monohydrate, and 90 parts of a compound of the formula

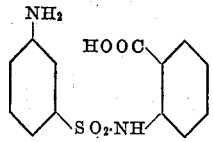

are mixed with 500 parts of sodium bisulfite solution of 40° Bé. and 150 parts of water, and the mixture is boiled for several hours. The dyestuff which has precipitated, after cooling, is filtered with suction and washed with a solution of sodium chloride. The dyestuff is further purified by dissolving it in water, precipitating it by mineral acid in the form of its free acid and neutralizing the latter again with sodium carbonate. By concentration the dyestuff is obtained in the form of a yellow powder; it dissolves in water to a yellow solution and dyes wool in an acid bath clear yellow tints of good properties of fastness. The dyestuff has the following constitution:

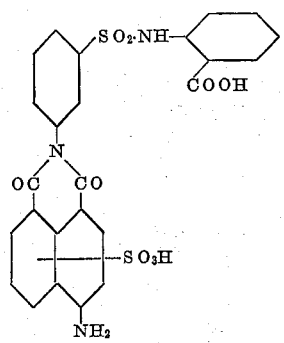

By after-chroming the dyeing in the usual manner, the properties of fastness, especially the fastness to light, are greatly improved.

The dyestuff may be converted in substance into the chromium complex compound, for instance, by boiling it with chromium formate or the like.

(2) 60 parts of 4-amino-sulfo-1.8-naphthalic acid or the corresponding amount of the anhydride and 65 parts of a compound of the formula

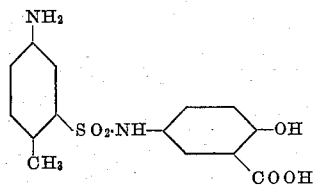

are mixed with a solution prepared from 500 parts of a solution of sodium bisulfite of 40° Bé. and 150 parts of water, and the mixture is boiled for several hours. A solution is thereby slowly formed. On cooling, the dyestuff separates; it is filtered with suction, freed from bisulfite by washing it with a sodium chloride solution, dissolved in water, precipitated by mineral acid in the form of the free acid and re-transformed into the sodium salt. The product thus obtained is a yellow powder which dissolves in water to a yellow solution. It dyes wool in an acid bath fast yellow tints; the after-chromed dyeing has an enhanced reddish hue and possesses very good properties of fastness.

(3) 18 parts of 4-amino-sulfo-1.8-naphthalic acid or the corresponding amount of the anhydride and 16 parts of a compound of the formula

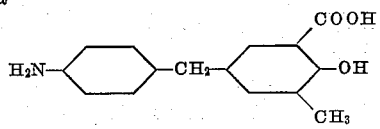

are boiled with 200 parts of sodium bisulfite solution of 40° Bé. and 50 parts of water until unchanged parent material can no longer be detected. A complete dissolution does not occur during the course of the reaction. After cooling, the whole is filtered with suction and the solid matter is washed with a solution of sodium chloride. The raw product is dissolved in water from the solution, the free acid is precipitated by acidifying the solution and the precipitate is filtered with suction. The solid matter is washed for a short time with water and is re-transformed into the sodium salt by treating it with an amount of sodium carbonate which is necessary for the neutralization. The dyestuff is a yellow powder which dissolves in water to a yellow solution. The after-chromed dyeing on wool is yellow and possesses very good properties of fastness.

(4) 60 parts of sulfo-amino-naphthalic acid and 70 parts of a compound of the formula

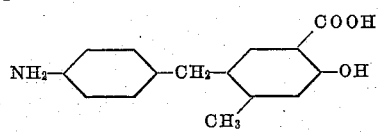

are mixed with a solution prepared from 800 parts by volume of a solution of sodium bisulfite and 200 parts of water, and the mixture is boiled for about 12 hours. The dyestuff which has precipitated in the form of a tough yellow mass, is separated from the solution, dissolved in water while warming, filtered and by acidifying the free acid is obtained in the form of a light-yellow precipitate. It dissolves rather sparingly in hot water to a yellow solution having a greenish fluorescence, in dilute alkalies and alkali carbonates very easily to a yellow solution, in organic solvents as, for instance, glacial acetic acid or alcohol on warming to a yellow solution having a green fluorescence. It dyes wool in a feebly acid bath bright yellow tints; the after-chromed dyeing has a yellow hue and possesses very good properties of fastness.

(5) By using in Example 4 instead of the diphenylmethane derivative the isomeric compound of the formula

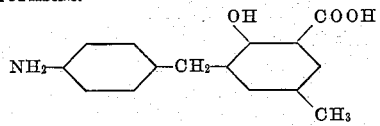

a dyestuff of similar properties is obtained. The dyestuff is obtained in the form of a yellow precipitate, filtered with suction, dissolved in water while warming and separated by means of dilute hydrochloric acid in the form of a flocky yellow precipitate. Its properties are very similar to those of the dyestuff obtainable according to example 4 and the after-chromed dyeing has likewise a yellow hue and possesses very good properties of fastness.

(6) 6 parts of 4-amino-sulfo-naphthalic acid and 8 parts of a compound of the formula

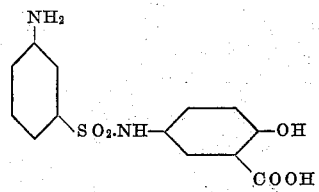

are boiled with 100 parts of a sodium bisulfite solution of specific gravity 1.3 (15° C.). After boiling for about 4 hours a dark yellow solution is obtained. After cooling, the dyestuff is precipitated by means of sodium chloride, filtered with suction, and washed with saturated sodium chloride solution. In order to purify it the raw product is dissolved in water and the solution is clarified by filtration. On acidification the dyestuff is obtained in the form of its free acid. It dissolves easily in dilute alkalies to a yellow solution, in organic solvents as, for instance, alcohol or glacial acetic acid, to a yellow solution having a greenish fluorescence. It dyes wool in an acid bath yellow tints; the after-chromed dyeing has a brownish-yellow hue.

(7) 60 parts of amino-sulfo-naphthalic acid and 75 parts of a compound of the formula

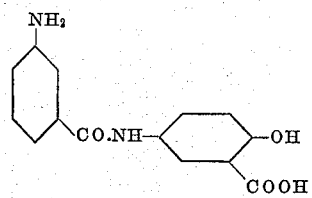

are boiled with a mixture of 800 parts of sodium bisulfite solution of 40° Bé. and 200 parts of water until unchanged amino-sulfo-naphthalic acid can no longer be detected. After cooling the whole mass is solidified to a crystalline magma; it is filtered with suction and freed from sodium bisulfite by washing it with a sodium chloride solution. After re-dissolving from water a yellow powder is obtained. The dyestuff dyes wool in an acid bath clear yellow tints; the after-chromed dyeing has also a yellow hue and possesses very good fastness properties.

(8) 30 parts of 4-amino-sulfo-1.8-naphthalic acid and 50 parts of a compound of the formula:

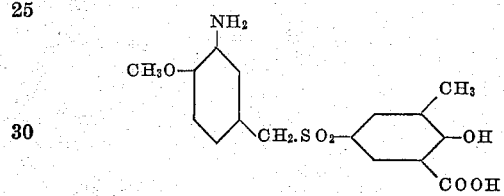

are boiled with a solution prepared from 500 parts of sodium bisulfite solution of 40° Bé. and 100 parts of water for several hours. After cooling the dyestuff has separated in the form of a tough yellow mass; it is separated from the bisulfite solution and dissolved in water while warming. On addition of a mineral acid yellow flakes are precipitated from the filtered solution. The dyestuff dissolves in hot water rather sparingly to a greenish-yellow solution, in glacial acetic acid or ethyl-alcohol to a yellow solution having a green fluorescence. It dyes wool in an acid bath clear yellow tints; the dyeings may be after-chromed in the usual manner and possess very good fastness properties.

We claim:

1. The members of the group consisting of compounds of the general formula:

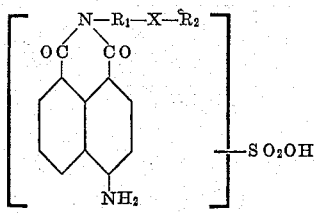

wherein X means a member of the group consisting of $-SO_2NH-$, $-CONH-$, $-CH_2SO_2-$ and $-CH_2-$, and $R_1$ and $R_2$ represent aryl radicals, $R_2$ containing a carboxyl and a hydroxyl group in ortho-positions to each other, and compounds of the general formula:

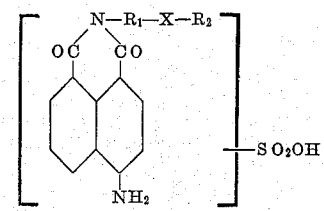

wherein X means a member of the group consisting of $-SO_2NH-$ and $-CONH-$, and $R_1$ and $R_2$ represent aryl radicals, $R_2$ containing a carboxyl group in ortho-position to the NH—group of X, and the alkali metal salts of these compounds, being dyestuffs yielding when after-chromed dyeings of valuable properties.

2. The members of the group consisting of compounds of the general formula:

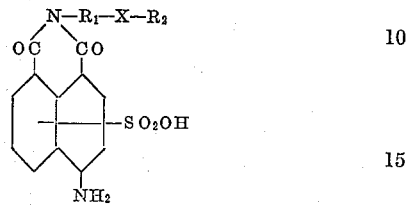

wherein X means a member of the group consisting of $-SO_2NH-$, $-CONH-$, $-CH_2SO_2-$ and $-CH_2-$, and $R_1$ and $R_2$ represent aryl radicals, $R_2$ containing a carboxyl and a hydroxyl group in ortho-positions to each other, and compounds of the general formula:

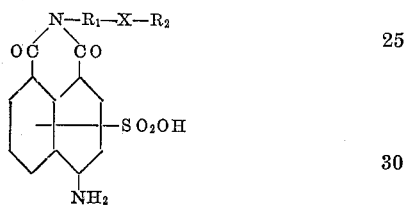

wherein X means a member of the group consisting of $-SO_2NH-$ and $-CONH-$, and $R_1$ and $R_2$ represent aryl radicals, $R_2$ containing a carboxyl group in ortho-position to the NH—group of X, and the alkali metal salts of these compounds, being dyestuffs yielding when after-chromed dyeings of valuable properties.

3. The compound of the formula

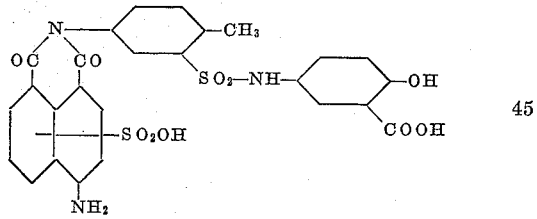

and the alkali metal salts thereof, being a yellow powder, dissolving in water to a yellow solution, dyeing wool in an acid bath fast yellow tints, the after-chromed dyeing having an enhanced reddish hue and possessing very good properties of fastness.

4. The compound of the formula

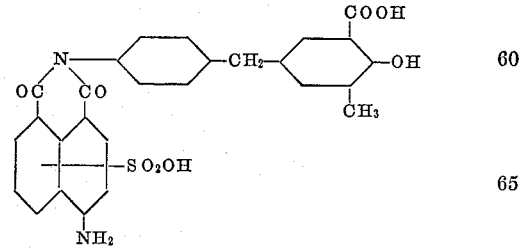

and the alkali metal salts thereof, being a yellow powder, dissolving in water to a yellow solution, the after-chromed dyeing on wool being yellow and possessing very good properties of fastness.

WILHELM ECKERT.
OTTO BRAUNSDORF.
ERICH FISCHER.